United States Patent
Suzuki et al.

(10) Patent No.: US 7,760,223 B2
(45) Date of Patent: Jul. 20, 2010

(54) OPTICAL SCAN APPARATUS AND IMAGE FORMATION APPARATUS

(75) Inventors: Seizo Suzuki, Funabashi (JP); Hironobu Mifune, Sendai (JP); Yoshinori Hayashi, Kawasaki (JP); Yasuhiro Nihei, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/116,002

(22) Filed: May 6, 2008

(65) Prior Publication Data

US 2008/0284838 A1 Nov. 20, 2008

(30) Foreign Application Priority Data

May 14, 2007 (JP) ............................. 2007-128103
Jan. 18, 2008 (JP) ............................. 2008-009468

(51) Int. Cl.
*B41J 2/435* (2006.01)
*B41J 2/47* (2006.01)

(52) U.S. Cl. ...................................... 347/235; 347/250
(58) Field of Classification Search ................. 347/229, 347/234, 235, 241, 247–250, 237
See application file for complete search history.

(56) References Cited

U.S. PATENT DOCUMENTS

| | | | |
|---|---|---|---|
| 6,233,081 B1 | 5/2001 | Suzuki et al. |
| 6,384,949 B1 | 5/2002 | Suzuki |
| 6,448,998 B1 | 9/2002 | Suzuki et al. |
| 6,657,761 B2 | 12/2003 | Suzuki et al. |
| 6,781,729 B2 | 8/2004 | Suzuki et al. |
| 6,788,444 B2 | 9/2004 | Suzuki et al. |
| 6,791,596 B2 | 9/2004 | Nihei et al. |
| 6,813,051 B2 | 11/2004 | Suzuki et al. |
| 6,826,104 B2 | 11/2004 | Kawaguchi et al. |
| 6,833,940 B2 | 12/2004 | Suzuki et al. |
| 6,853,397 B2 * | 2/2005 | Onishi ........................ 347/241 |
| 6,906,739 B2 | 6/2005 | Suzuki et al. |
| 6,927,789 B2 | 8/2005 | Ozasa et al. |
| 6,933,957 B2 | 8/2005 | Omori et al. |
| 6,999,208 B2 | 2/2006 | Suzuki et al. |
| 7,045,773 B2 | 5/2006 | Suzuki et al. |

(Continued)

FOREIGN PATENT DOCUMENTS

JP 56104572 A * 8/1981

(Continued)

*Primary Examiner*—Hai C Pham
(74) *Attorney, Agent, or Firm*—Oblon, Spivak, McClelland, Maier & Neustadt, L.L.P.

(57) ABSTRACT

An optical scan apparatus which deflects a plurality of light beams to scan a write region on a scan surface in a main scan direction is configured to include a light source which has a plurality of emission portions emitting the plurality of light beams arranged two-dimensionally on a plane in parallel to the main scan direction and a sub scan direction perpendicular to the main scan direction; a deflector which deflects the plurality of light beams from the plurality of emission portions; a light receiving element which receives the light beams and outputs a synchronous detection signal in accordance with the received light beams; and a control unit which selectively controls any one of the emission portions to emit a light beam upon each scanning and allows the light beam from the selected emission portion to be incident on the light receiving element via the deflector.

12 Claims, 10 Drawing Sheets

U.S. PATENT DOCUMENTS

| | | |
|---|---|---|
| 7,061,658 B2 | 6/2006 | Suzuki |
| 7,088,485 B2 | 8/2006 | Suzuki |
| 7,212,224 B2 | 5/2007 | Nihei et al. |
| 7,256,815 B2 | 8/2007 | Suzuki et al. |
| 7,283,151 B2 | 10/2007 | Nihei et al. |
| 7,327,379 B2 | 2/2008 | Nihei et al. |
| 2005/0089069 A1 | 4/2005 | Ozasa et al. |
| 2005/0219354 A1 | 10/2005 | Omori et al. |
| 2006/0209170 A1 | 9/2006 | Nihei |
| 2006/0285186 A1 | 12/2006 | Ishida et al. |
| 2007/0030548 A1 | 2/2007 | Nihei et al. |
| 2007/0091163 A1 | 4/2007 | Omori et al. |
| 2007/0132828 A1 | 6/2007 | Ishida et al. |
| 2008/0019255 A1 | 1/2008 | Imai et al. |
| 2008/0088893 A1 | 4/2008 | Ishida et al. |

FOREIGN PATENT DOCUMENTS

| | | | |
|---|---|---|---|
| JP | 58038066 A | * | 3/1983 |
| JP | 2002-131662 | | 5/2002 |
| JP | 2004-287292 | | 10/2004 |
| JP | 2005-250319 | | 9/2005 |
| JP | 2008-203760 | | 9/2008 |

* cited by examiner

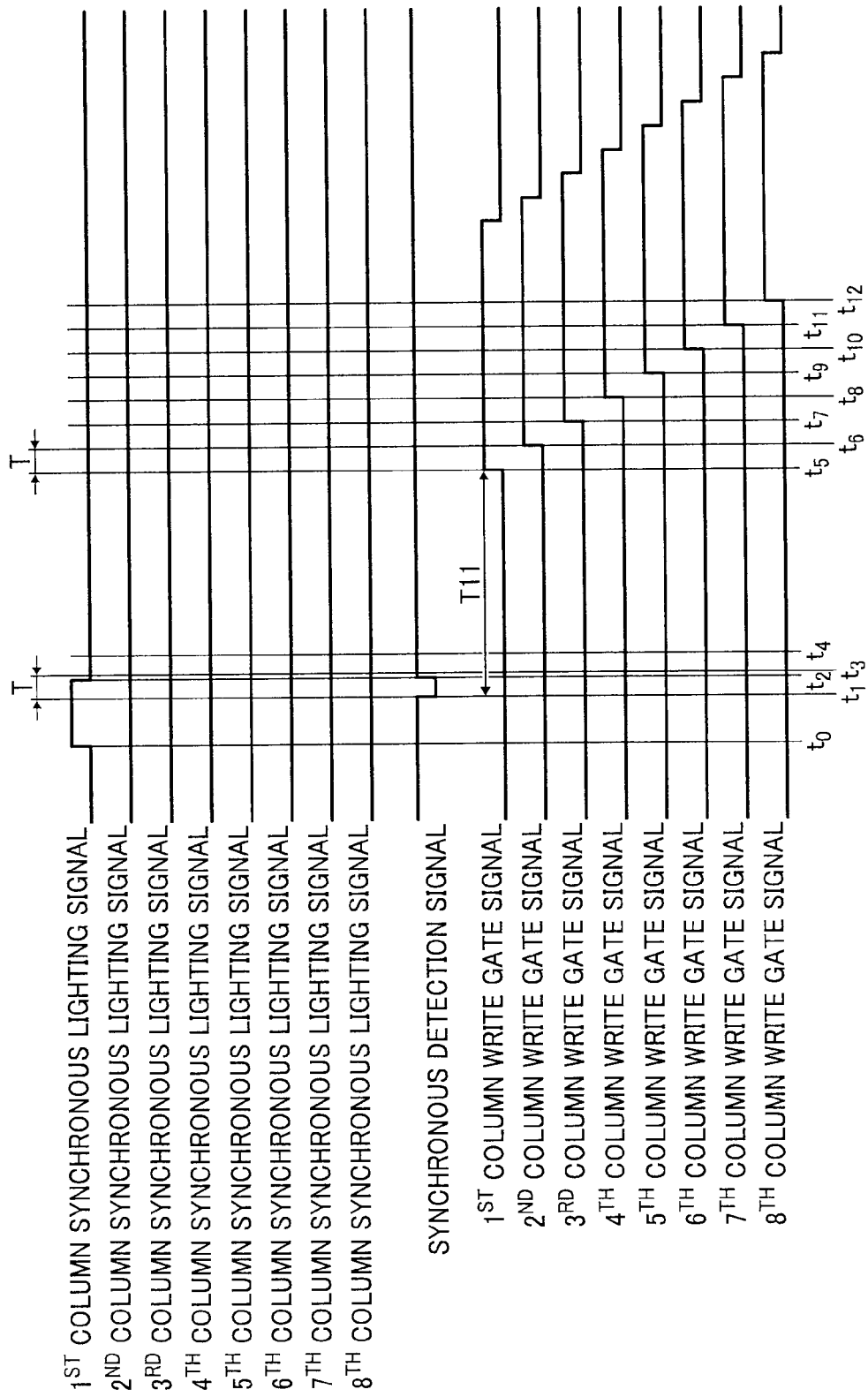

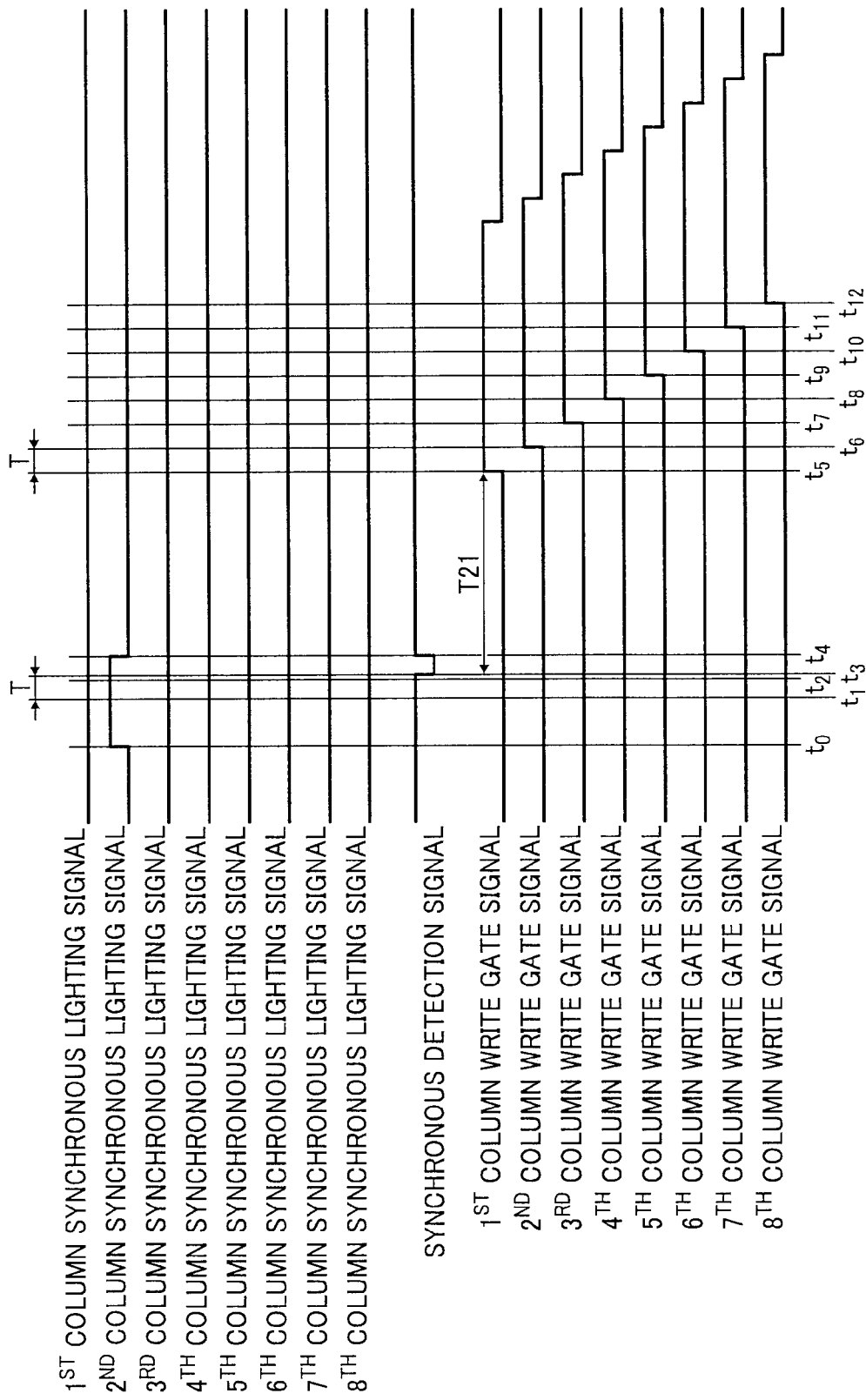

OPTICAL SCAN APPARATUS AND IMAGE FORMATION APPARATUS

CROSS-REFERENCE TO RELATED APPLICATIONS

The present application is based on and claims priority from Japanese Patent Application No. 2007-128103, filed on May 14, 2007, and No. 2008-9468, filed on Jan. 18, 2008, the disclosure of which is hereby incorporated by reference in its entirety.

BACKGROUND OF THE INVENTION

1. Field of the Invention

The present invention relates to an optical scan apparatus and an image formation apparatus, particularly to an optical scan apparatus which scans a surface with a plurality of light beams as well as to an image formation apparatus including the optical scan apparatus.

2. Description of the Related Art

A known image formation apparatus using the Carlson process forms images by, for example, scanning the surface of a rotating photoconductive drum with a plurality of light beams to form an electrostatic latent image thereon, visualizing the electrostatic latent image as a toner image, and fusing the toner image on a sheet of paper as a recording medium. In recent years, this type of image formation apparatus has been well used in easy printing as an on-demand print system. Therefore, there has been increasing demand for formation of high-density images and speeding-up of image outputs.

In general, in order to speed up the image outputs, a print speed is increased by increasing the rotation speed of a polygon mirror deflecting the light beam and the rotation speed of the photoconductive drum. However, there is a problem that along with the increase of the rotation speed of the polygon mirror, noise and vibration from a drive system is increased as well as power consumption, resulting in lowering durability of the apparatus. Further, the speeding-up of the image outputs has a trade-off relation with formation of the high-density images so that image quality deteriorates as the rotation speed of the polygon mirror increases.

In view of the above problems, Japanese Laid-open Patent Application Publication No. 2005-250319 and No. 2004-287292, for example, have disclosed a scan method of scanning a photoconductive drum with plural light beams at once in order to concurrently realize the formation of the high-density images and the speeding-up of image outputs. The method disclosed therein employs a surface emitting laser having plural emission portions and can collectively deflect the plural light beams from the surface emitting laser to thereby scan the photoconductive drum with the plural light beams at once.

The surface emitting laser used therein such as vertical cavity surface emitting laser (VCSEL) is composed by two-dimensionally arranging the emission portions on a single element easily. Because of this, it is easier to increase the number of light beams used for a single scan thereon than an edge emitting laser; however, there is drawbacks in the surface emitting laser that it is hard to speed up the image outputs and the longevity of the element tends to be relatively short due to thermal interference between the emission portions.

SUMMARY OF THE INVENTION

In view of solving the above problems, an object of the present invention is to provide an optical scan apparatus which can suppress thermal deterioration of a light source with a reduction of running cost.

According to a first aspect of the present invention, an optical scan apparatus which deflects a plurality of light beams to scan a write region on a scan surface in a main scan direction is configured to comprise a light source which has a plurality of emission portions arranged two-dimensionally on a plane in parallel to the main scan direction and a sub scan direction perpendicular to the main scan direction, the plurality of emission portions emitting the plurality of light beams; a deflector which deflects the plurality of light beams from the plurality of emission portions; a light receiving element which receives the light beams and outputs a synchronous detection signal in accordance with the received light beams; and a control unit which selectively controls any one of the emission portions to emit a light beam for each scanning and allows the light beam from the selected emission portion to be incident on the light receiving element via the deflector.

According to a second aspect of the present invention, an image formation apparatus which forms an image by forming a toner image based on a latent image obtained from image information and fusing the toner image on a recording medium is configured to comprise an optical scan apparatus according to the present invention; a photoconductor on which a latent image is formed by the optical scan apparatus; a develop unit which visualizes the latent image formed on a scan surface of the photoconductor as a toner image; and a transfer unit which fuses the toner image visualized by the develop unit on the recording medium.

According to a third aspect of the present invention, another image formation apparatus is provided which forms a multi-color image by forming toner images based on latent images in respective colors obtained from multi-color image information and superimposing and fusing the toner images on a recording medium. The image formation apparatus is configured to comprise an optical scan apparatus according to the present invention; a plurality of photoconductors on which latent images in respective colors are formed by the optical scan apparatus, respectively; a develop unit which visualizes the latent images formed on scan surfaces of the photoconductors as toner images; and a transfer unit which superimposes and fuses the toner images in respective colors visualized by the develop unit on the recording medium.

BRIEF DESCRIPTION OF THE DRAWINGS

FIGS. 10A, 10B are for describing operation of the light source driver 101; and

DETAILED DESCRIPTION OF THE PREFERRED EMBODIMENTS

First Embodiment

Hereinafter, the embodiments of the present invention will be described with reference to the accompanying drawings.

Figure 1:
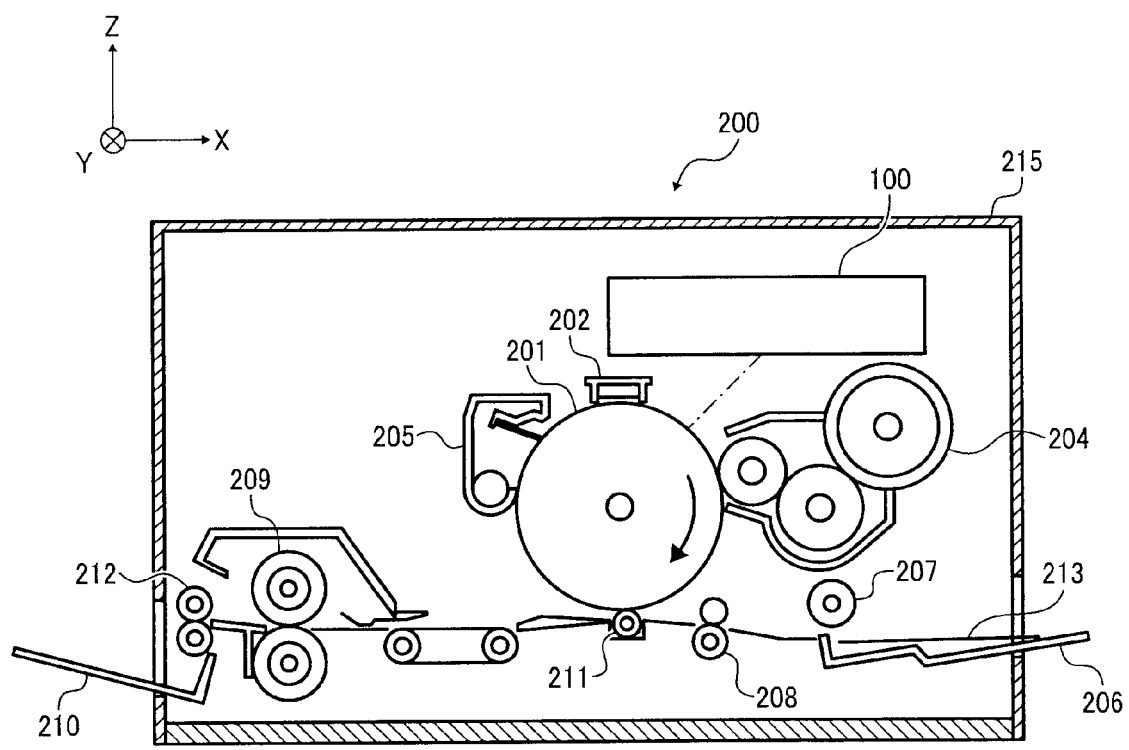
FIG. 1 shows a schematic structure of an image formation apparatus 200 according to a first embodiment of the present invention.
Figure 2:
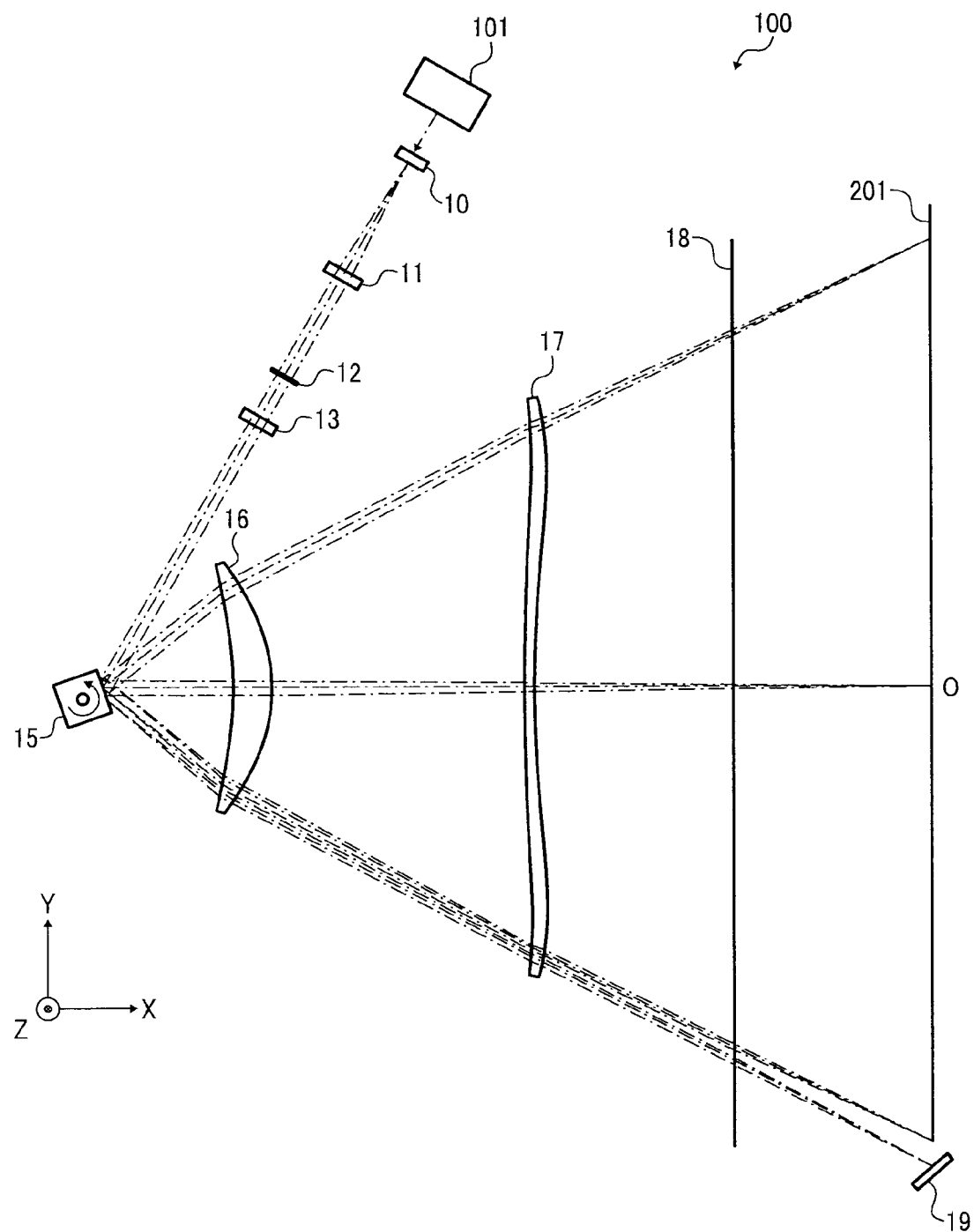
FIG. 2 shows a layout of an optical scan apparatus 100.
Figure 3:
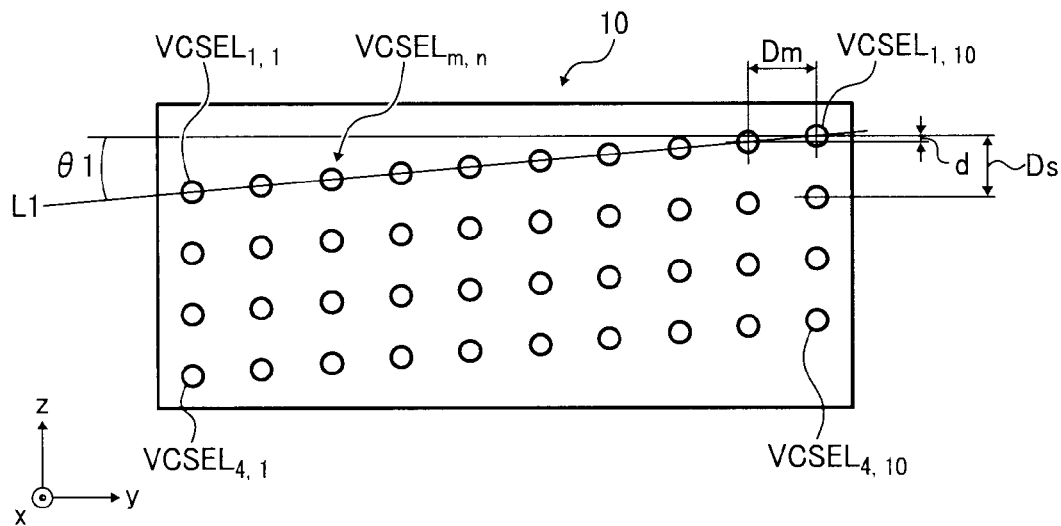
FIG. 3 shows a light source 10.

The first embodiment of the present invention will be described with reference to FIGS. 1 to 3. FIG. 1 shows the schematic structure of an image formation apparatus 200 according to the first embodiment.

The image formation apparatus 200 is a printer using a Carlson process and prints images by transferring toner images onto a sheet of paper. The image formation apparatus 200 includes, as shown in FIG. 1, an optical scan apparatus 100, a photoconductive drum 201, an electric charger 202, a toner cartridge 204, a cleaning case 205, a paper feed tray 206, a paper feed roller 207, a resist roller pair 208, a transfer charger 211, a fuse roller 209, a discharge roller 212, a paper discharge tray 210, a not-shown main controller for controlling the above components collectively, and a housing 215 containing the above components.

The housing 215 of a substantially rectangular solid shape has openings to be communicative with internal space thereof on both side walls in X and reverse X-axis directions. The optical scan apparatus 100 is placed in the upper side of the housing 215 and scans a region (hereinafter, to be referred to as write region) on the surface of the photoconductive drum 201 in a main scan direction (Y-axis direction in FIG. 1) with a light beam modulated according to image information, thereby forming a latent image on the write region. The structure of the optical scan apparatus 100 will be described in detail later.

The photoconductive drum 201 is a cylindrical member having a photoconductive layer on its surface which has property to become electrically conductive when illuminated with the light beam. It is disposed under the optical scan apparatus 100 so that its longitudinal direction is to be the Y-axis direction. The photoconductive drum 201 is rotated by a not-shown rotation mechanism clockwise (as indicated by the arrow in FIG. 1). Around the photoconductive drum 201 disposed are the electric charger 202 at 12 o'clock position (upper side), the toner cartridge 204 at 2 o'clock position, the transfer charger 211 at 6 o'clock position and the cleaning case 205 at 10 o'clock position in FIG. 1.

The electric charger 32A is disposed with a predetermined clearance over the surface of the photoconductive 201 to electrically charge it with a predetermined voltage.

The toner cartridge 204 includes a cartridge body containing a toner and a developer roller charged with a voltage of reverse polarity of that of the photoconductive drum 201, and the like. The toner cartridge 204 supplies the toner in the cartridge body to the surface of the photoconductive drum 201 via the developer roller.

The cleaning case 205 is provided with a cleaning blade of a rectangular shape with its longitudinal direction as the Y-axis direction, and it is disposed so that one end of the cleaning blade gets in contact with the surface of the photoconductive drum 201. The toner sticking on the surface of the photoconductive 201 is peeled off by the cleaning blade along with the rotation of the photoconductive drum 201 and collected in the cleaning case 205.

The transfer charger 211 is disposed with a predetermined clearance over the surface of the photoconductive 201 and applied with a voltage of reverse polarity of that of the electric charger 202.

The paper feed tray 206 is placed so as to partially protrude from the opening on the side wall in the X-axis direction and accommodate plural sheets of paper supplied from exterior.

The paper feed roller 207 extracts paper sheets 213 one by one from the paper feed tray 206 to feed them to a gap formed between the photoconductive drum 201 and the transfer charger 211 via the resist roller pair 208 composed of a pair of rotary rollers.

The fuse roller 209 is composed of a pair of rotary rollers, and applies heat and pressure to the paper sheets 213 to deliver them to the discharge roller 212.

The discharge roller 212 is composed of a pair of rotary rollers and the like and discharges the paper sheets 213 transferred from the fuse roller 209 to the discharge tray 210. The discharge tray 210 is disposed so as to partially protrude from the opening on the side wall in the reverse X-axis direction and to sequentially stack up the sheets 213.

Next, with reference to FIG. 2, the structure of the optical scan apparatus 100 will be described. As shown in FIG. 2, the optical scan apparatus 100 comprises a light source 10, a coupling lens 11, an aperture member 12, a linear image formation lens 13, and a polygon mirror 15 which are sequentially disposed from the light source 10 as a starting point on a straight line which makes a 70 degree angle with the X axis, first and second scan lenses 16, 17, and a reflective mirror 18 which are disposed in sequence on an X-axis direction side of the polygon mirror (deflector) 15, a light receiving element 19 receiving a light beam before incident on the photoconductive drum 201, a light source driver (control unit) 101 driving the light source 10, and so on.

The light source 10 is a surface emitting semiconductor laser array on which luminous points such as VCSELs are two-dimensionally arranged. As shown in FIG. 3, 40 VCSELs (emission portions) are arranged in matrix of 4 rows, 10 columns on a light emitting plane (x-axis direction side in the drawing). The rows are arranged in a direction in parallel with the straight line L1 which makes an angle $\theta 1$ with the y-axis direction, and the columns are arranged in a direction in parallel with the z-axis direction. Each VCSEL has a near-field pattern of 4 μm diameter, and emits a light beam with a wavelength of 780 nm and a divergence angle at 7±1 degrees in the main and sub scan directions. In the present embodiment, the interval of the rows Ds is set to be 20 μm while the interval of the columns Dm is set to be 30.0 μm. The interval of the adjacent VCSELs in the z-axis direction (sub scan direction) is set to be 2.0 μm. Note that hereinafter, the position of the VCSELs is expressed in such a manner that VSCEL located at m-th row, n-th column is referred to as VCSELm, n (m=1, 2, 3, 4, n=1, 2, 3 . . . 10) for the sake of simplicity as shown in FIG. 3.

Returning to FIG. 2, the coupling lens 11 has a focal length of 46.5 mm and makes a light beam from the light source 10 a parallel light and couples it at a focal position on the exit side.

The aperture member 12 has a rectangular or elliptic opening and the center of the opening is positioned at or in the vicinity of the focal position of the coupling lens 11. A plurality of light beams emitted from the light source 10 transmit through the coupling lens 11 to be substantially parallel light beams and then pass through the opening of the aperture member 12 to be adjusted in a desired beam form.

The linear image formation lens 13 is a cylindrical lens having refractive power in the sub scan direction and has an incidence plane at a position 10.3 mm distant from the aperture member 12. It is configured to form images of the respective light beams having passed through the coupling lens 11 in the vicinity of the reflective surface of the polygon mirror 15 in the sub scan direction.

The following table 1 shows paraxial curvature radius in the main and sub scan directions Rm, Rs of incidence and exit planes 11a, 11b of the coupling lens 11, and of incidence and exit planes 13a, 13b of the linear image formation lens 13, and radial thickness D (mm) at the center and refraction N of the respective lenses 11, 13.

TABLE 1

| Plane | Rm | Rs | D | N |
|---|---|---|---|---|
| 11a | flat | flat | 3 | 1.511 |
| 11b | −24.4 | −24.4 | | |
| 13a | flat | 56 | 3 | |
| 13b | flat | flat | | |

The polygon mirror 15 has a quadrangular shape with an upper square surface internally inscribed with a circle of radius of 7 mm. It has four deflection surfaces and is rotated at a fixed angular velocity by a not-shown rotary mechanism around the axis in parallel to the Z axis. With such a configuration, the light beams are made incident on the polygon mirror 15 to scan in the Y-axis direction.

The first scan lens 16 has fθ property and is disposed so that its incidence plane is located at a position 46.3 mm away from the center of rotation of the polygon mirror 15 to the X-axis direction.

The second scan lens 17 is a special toroidal lens having refraction power in the sub scan direction and disposed so that its incidence plane is located at a position 89.7 mm away from the exit plane of the first scan lens to the X-axis direction as well as optical distance between its exit plane and the photoconductive drum 201 is 141.4 mm.

The following table 2 shows paraxial curvature radius in the main and sub scan directions Rm, Rs of incidence and exit planes 16a, 16b of the first scan lens 16, and of incidence and exit planes 17a, 17b of the second scan lens 17, and radial thickness D (mm) at the center and refraction N of the respective lenses 16, 17.

TABLE 2

| Plane | Rm | Rs | D | N |
|---|---|---|---|---|
| 16a | −120 | −500 | 13.5 | 1.524 |
| 16b | −59.3 | −600 | | |
| 17a | flat | 521.9 | 3.5 | |
| 17b | 540.6 | −40.8 | | |

The shapes of the respective incidence planes 16a, 17a, and exit planes 16b, 17b of the first and second scan lenses 16, 17 are expressed by the following expressions (1), (2) where Y, Z are coordinates in the main and sub scan directions when the optical axis position is origin, and coefficients $a_n$, $b_n$ are shown in the following table 3.

$$X(Y) = \frac{\frac{Y^2}{R_m}}{1+\sqrt{1-(1+a_0)\cdot\left(\frac{Y}{R_m}\right)^2}} + a_1\cdot Y + a_2\cdot Y^2 + a_3\cdot Y^3 + a_4\cdot Y^4 + \ldots \quad (1)$$

$$Cs(Z) = \frac{1}{R_s} + b_1\cdot Z + b_2\cdot Z^2 + b_3\cdot Z^3 + \ldots \quad (2)$$

TABLE 3

| | First Scan Lens | | Second Scan Lens | |
|---|---|---|---|---|
| | 16a | 16b | 17a | 17b |
| $a_0$ | — | — | — | — |
| $a_4$ | 8.89 × 10⁻⁷ | 9.22 × 10⁻⁷ | 3.29 × 10⁻⁷ | 1.28 × 10⁻⁷ |
| $a_6$ | −2.63 × 10⁻¹⁰ | 6.78 × 10⁻¹¹ | −7.09 × 10⁻¹¹ | −4.63 × 10⁻¹¹ |
| $a_8$ | −2.18 × 10⁻¹⁴ | −4.11 × 10⁻¹⁴ | 6.27 × 10⁻¹⁵ | 4.05 × 10⁻¹⁵ |
| $a_{10}$ | 1.37 × 10⁻¹⁷ | −1.37 × 10⁻¹⁷ | −2.73 × 10⁻¹⁹ | −1.66 × 10⁻¹⁹ |
| $a_{12}$ | −3.14 × 10⁻²¹ | 2.07 × 10⁻²¹ | 4.74 × 10⁻²⁴ | 2.59 × 10⁻²⁴ |
| $b_1$ | — | −1.59 × 10⁻⁶ | −7.58 × 10⁻⁷ | — |
| $b_2$ | — | −4.33 × 10⁻⁶ | −1.13 × 10⁻⁶ | 2.31 × 10⁻⁷ |
| $b_3$ | — | 4.98 × 10⁻⁹ | 2.61 × 10⁻¹⁰ | — |
| $b_4$ | — | −2.86 × 10⁻⁹ | 7.90 × 10⁻¹¹ | — |
| $b_5$ | — | −2.68 × 10⁻¹² | −5.03 × 10⁻¹⁴ | — |
| $b_6$ | — | 2.88 × 10⁻¹³ | 1.41 × 10⁻¹⁴ | — |
| $b_7$ | — | −1.92 × 10⁻¹⁵ | 4.55 × 10⁻¹⁸ | — |
| $b_8$ | — | 2.04 × 10⁻¹⁵ | −2.01 × 10⁻¹⁸ | — |
| $b_9$ | — | 1.01 × 10⁻¹⁸ | −1.55 × 10⁻²² | — |
| $b_{10}$ | — | −6.73 × 10⁻¹⁹ | 7.49 × 10⁻²⁸ | — |

The light receiving element 19 outputs electric signals (photoelectrical conversion signals) in accordance with intensity of incident light beams, for example. It receives light beams before deflected by the polygon mirror 15 to be incident on the write region of the photoconductive drum 201, and outputs signals in accordance with the intensity of the received light beams. In FIG. 2, the light receiving element 19 is disposed on the reverse Y-axis side of the photoconductive drum 201, however, it is not limited thereto. The light receiving element 19 can be placed at any position which allows scanning light to be incident thereon before the upper surface of the photoconductive drum 201 via a reflective mirror or the like.

The light source driver 101 drives the light source 10 while monitoring a synchronous detection signal outputted from the light receiving element 19.

Next, the operation of the image formation apparatus 200 will be described. When the image formation apparatus 200 receives image information from a higher-order apparatus, the light source driver 101 of the optical scan apparatus 100 selects four VCSELs, $VCSEL_{1,1}$ to $VCSEL_{4,1}$ in the first column from all the VCSELs on the light source 10 for example to emit four light beams therefrom.

Having passed through the coupling lens 11 and aperture member 12, the four light beams from the $VCSEL_{1,1}$ to $VCSEL_{4,1}$ are gathered on the deflection surfaces of the polygon mirror 15 by the linear image formation lens 13, and deflected by a rotating polygon mirror 15 to scan in the Y-axis direction. Then, the scanning light beams are received by the light receiving element 19 via the first and second scan lenses 16, 17 prior to entering the write region on the photoconductive drum 205.

By monitoring the synchronous detection signal output from the light receiving element 19, the light source driver 101 detects that the four light beams from the $VCSEL_{1,1}$ to $VCSEL_{4,1}$ have been incident on the light receiving element 19. In a delay time T1 after the detection, it drives all the 40 VCSELs, $VCSEL_1$ to $VCSEL_{40}$ of the light source 10 based on image information. Thereby, the write region of the photoconductive drum 201 is scanned with the 40 light beams emitted from the $VCSEL_1$ to $VCSEL_{40}$. Note that the delay time T1 is determined from moving speed of beam spots on the scan surface, a distance from the light receiving element 19 to the write region of the photoconductive drum 205, and positions of the VCSELs of the light source 10.

Upon completion of the first scanning on the write region of the photoconductive drum 201, the light source driver 101 selects next four VCSELs, $VCSEL_{1,2}$ to $VCSEL_{4,2}$ in the second column of the light source 10 to emit four light beams. Similarly to the first scanning, upon detecting that the four light beams from the $VCSEL_{1,2}$ to $VCSEL_{4,2}$ have been incident on the light receiving element 19, the light source driver 101 drives all the 40 VCSELs, $VCSEL_1$ to $VCSEL_{40}$ of the light source 10 according to image information in a delay time T2 after the detection, to emit the 40 light beams with which the write region of the photoconductive drum 201 is scanned.

For the third and subsequent scannings, the light source driver 101 sequentially selects four VCSELs in unit of column, $VCSEL_{1,3}$ to $VCSEL_{4,3}$, $VCSEL_{1,4}$ to $VCSEL_{4,4}$, . . . , $VCSEL_{1,n}$ to $VCSEL_{4,n}$ to emit the light beams, and obtains synchronous detection signals. While monitoring the synchronous detection signals, it allows the write region of the photoconductive drum 201 to be scanned with the light beams. After selecting $VCSEL_{1,10}$ to $VCSEL_{4,10}$ in the $10^{th}$ column at the right end in FIG. 3, the light source driver 101 re-selects the $VCSEL_{1,1}$ to $VCSEL_{4,1}$ in the first column.

Meanwhile, the surface of the photoconductive drum 201 is charged by the electric charger 202 at a predetermined voltage, therefore, electric charges are distributed thereon at a fixed density. When the photoconductive drum 201 is scanned with the light beams deflected by the polygon mirror 15, a carrier (electric charge) is generated and moves on a portion of a photoconductive layer thereof illuminated with the light beams, so that electric potential thereof decreases. Accordingly, by scanning the photoconductive drum 201 rotating in the direction indicated by the arrow in FIG. 1 with the light beams modulated according to the image information, an electrostatic latent image defined by distributed charges is formed on the surface thereof.

Then, the developer roller of the toner cartridge 204 supplies a toner to the electrostatic latent image formed on the surface of the photoconductive drum 201. At this point, since the developer roller of the toner cartridge 204 is charged with a voltage of reverse polarity of that of the photoconductive drum 201, the toner attached to the developer roller is charged with the same polarity of that of the photoconductive drum. Because of this, the toner is not attached to the portion on which the electric charges are distributed but attached only to the portion which has been scanned. Thereby, the electrostatic latent image is visualized as a toner image on the surface of the photoconductive drum. The toner image is transferred onto the paper sheet 213 by the transfer charger 211 and fused thereon by the fuse roller 209. Now, an image is formed on the paper sheet 213. Paper sheets 213 with an image formed are discharged by the discharge roller 212 to be stacked up sequentially on the discharge tray 210.

As described above, the optical scan apparatus 100 according to the present embodiment sequentially selects, for each scanning, the VCSELs of the light source 10 to emit in unit of column from the $VCSEL_{1,1}$ to $VCSEL_{4,1}$ in the first column to the $VCSEL_{1,10}$ to $VCSEL_{4,10}$ in the $10^{th}$ column, in order to obtain the synchronous detection signals for scanning the write region. This allows the 40 VCSELs to equally share thermal load of the light source 10 due to the emission of the light beams for obtaining the synchronous detection signals and accordingly makes it possible to lengthen the longevity of the light source 10.

Also, according to the present embodiment, it is configured that the light beams are emitted selectively from the VCSELs in the first column to the $10^{th}$ column in order, however, the present invention is not limited thereto. Alternatively, the VCSELs can be selected randomly in unit of column. In this case, it is also possible for the 40 VCSELs to equally share thermal load of the light source 10 due to the emission of the light beams for obtaining the synchronous detection signals and accordingly makes it possible to lengthen the longevity of the light source 10. Further, selecting different VCSELs for preceding and succeeding scannings makes it possible to effectively reduce the thermal deterioration of the light source 10.

Further, it is configured that the VCSELs are selected to emit in unit of column. However, the present invention is not limited thereto. The VCSELs can be selected in unit of row or one or plural VCSELs can be selected from each column.

Figure 4:
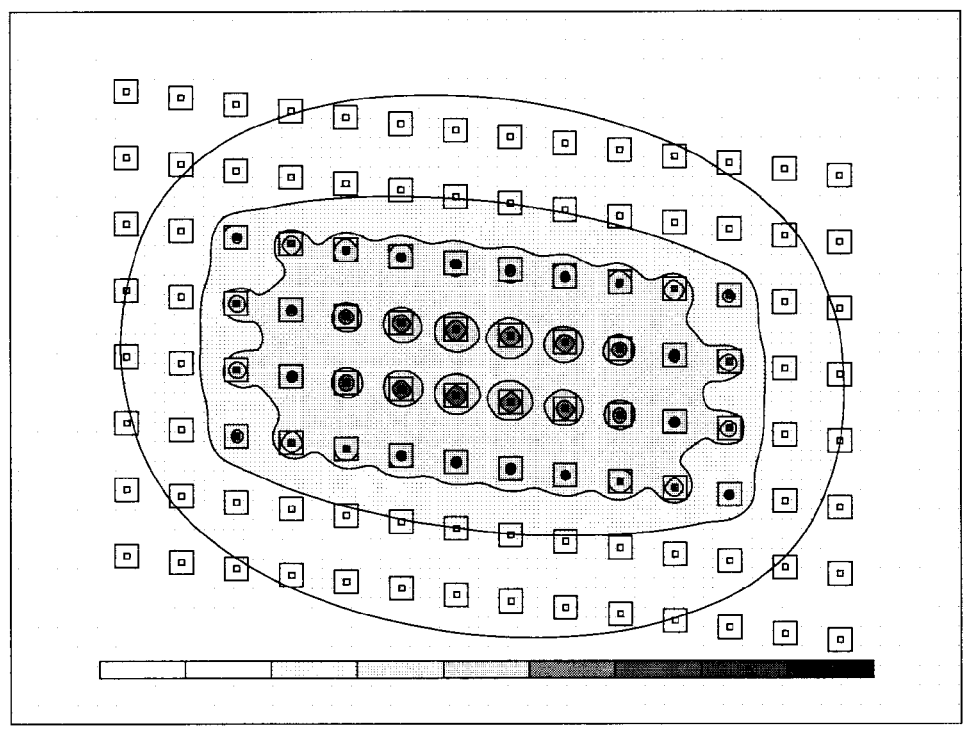
FIG. 4 shows thermal distribution of the light source 10.

FIG. 4 shows simulation result of thermal distribution on the surface of the light source 10. In the drawing, a portion in the lowest temperature is colored in black. The rest of portions are colored in shades of gray depending on the temperature thereof. It can be seen from the drawing that in the light-emitting VCSELs on the light source 10, temperature is highest around the center thereof, and the more distant from the center, the lower the temperature. This is because radiation efficiency around the center is low since it is surrounded by plural VCSELs while radiation efficiency of a portion increases as it is distant from the center.

As seen from the above, it is made possible to prevent the light source 10 from deteriorating due to the light emission by selectively allowing, to acquire synchronous detection signals, any of the VCSELs in the first and tenth columns to emit which are most distant from the center in the main scan direction (y-axis direction), or any of the VCSELs in the first and fourth rows which are most distant from the center in the sub scan direction (z-axis direction), for example.

Figure 5A:
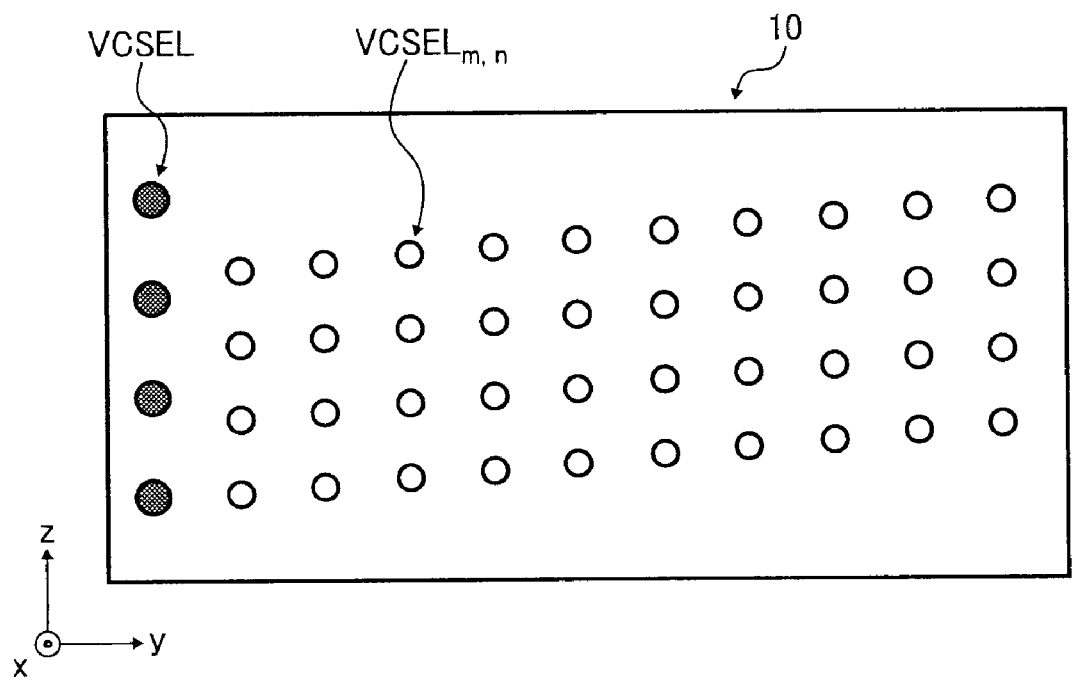
FIGS. 5A, 5B show modified examples of the light source 10.
Figure 5B:
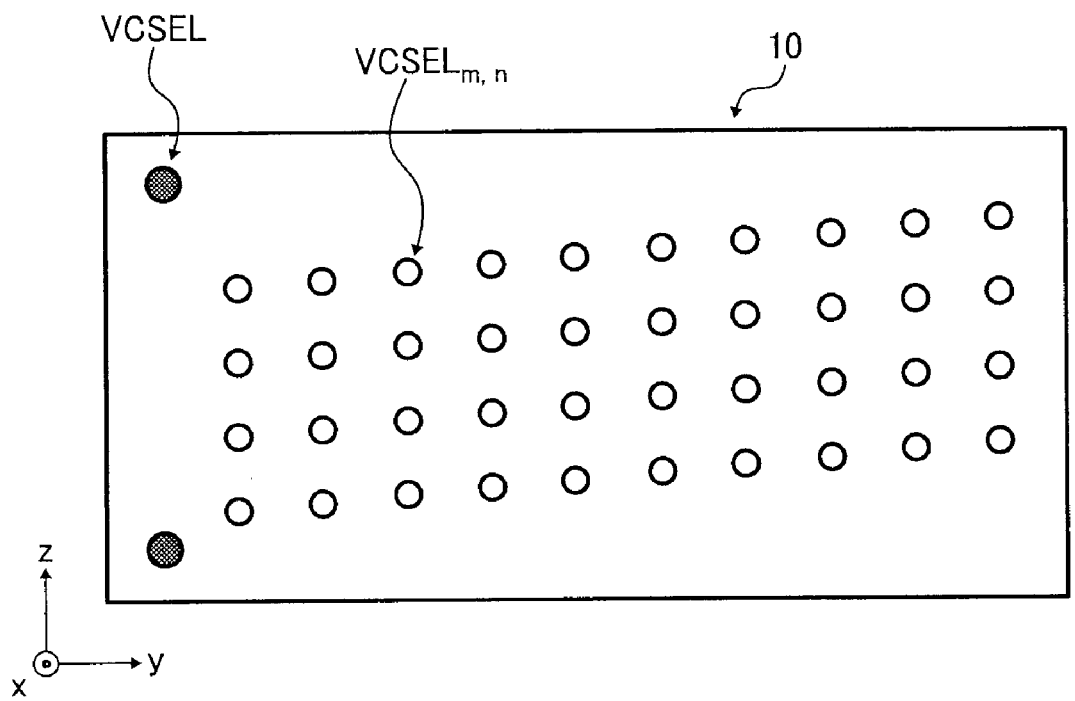

FIGS. 5A, 5B show another example in which the light source 10 includes, in the outer periphery or the like, synchronous VCSELs indicated by black dots which emit light beams only for obtaining synchronous detection signals from the light receiving element 19 and not for scanning the write region. The light source 10 can be configured to emit the light beams only from the synchronous VCSELs for acquiring the synchronous detection signals. In this manner, thermal load for obtaining the synchronous detection signals can be imposed only on the synchronous VCSELs, thereby reducing the thermal load of the VCSELs for scanning the write region and increasing the longevity of the light source 10 accordingly.

Further, in the present embodiment, it is made possible to increase the S/N ratio of the synchronous detection signals outputted from the light receiving element 19 by controlling the light source 10 so that the light beam from the VCSEL selected for the synchronous detection signal is to be larger than that from the VCSEL scanning the write region.

Furthermore, the light source 10 can be configured that the intensity of the light beam incident on the light receiving element 19 is unchanged even when that of the light beam scanning the write region is changed according to the recording medium on which images are formed. In this manner, when the light beam scanning the write region is set at high intensity, the light source 10 can be prevented from bearing a higher thermal load thereon.

Figure 6:
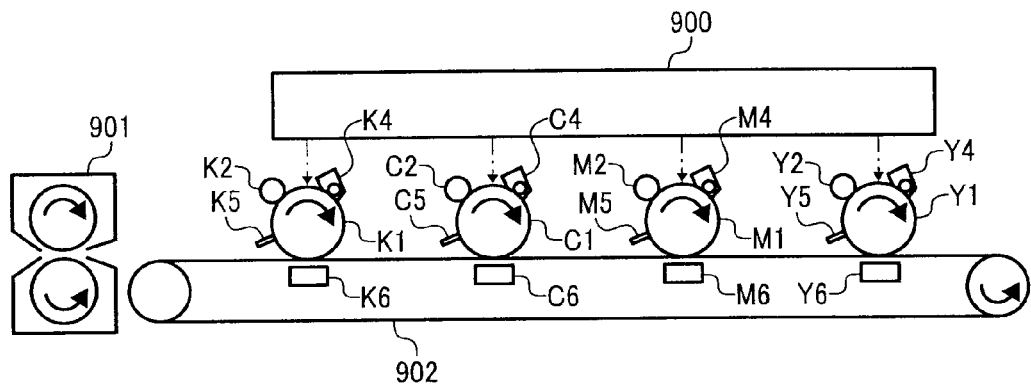
FIG. 6 shows an image formation apparatus which forms multi-color images.

Note that in the above first embodiment, the optical scan apparatus 100 is used in the monochromatic image formation apparatus 200 (printer), however, the present invention is not limited thereto. As shown in FIG. 6 as a way of example, it is applicable to a tandem color printer with a plurality of photoconductive drums adoptable for color images. The tandem color printer shown in FIG. 6 comprises photoconductive drums for black (K), cyan (C), magenta (M), yellow (Y) K1, C1, M1, Y1, electric chargers K2, C2, M2, Y2, develop units K4, C4, M3, Y4, cleaning units K5, C5, M5, Y5, transfer chargers K6, C6, M6, Y6, and an optical scan apparatus 900, a transfer belt 902, a fuser unit 901, and so on.

The optical scan apparatus 900 comprises a light source 10 on which plural emission portions for black, cyan, magenta, yellow colors are formed. It is configured such that the light beams from the emission portions for black illuminate the photoconductive drum K1, ones from the emission portions for cyan illuminate the photoconductive drum C1, ones from the emission portions for magenta illuminate the photoconductive drum M1, and ones from the emission portion for yellow illuminate the photoconductive drum Y1. Alternatively, the optical scan apparatus 900 can be configured to include separate light sources for the respective colors, or separate optical scan apparatuses 900 can be provided for the respective colors.

In FIG. 6, each of the photoconductive drums rotates in the direction indicated by the arrows, and the electric chargers, develop units, transfer chargers, and cleaning units are disposed in this order around the photoconductive drums, respectively. Each of the electric chargers evenly charges the surface of the corresponding photoconductive drum. The optical scan apparatus 900 emits the light beams to the charged surfaces of the photoconductive drums, thereby forming an electrostatic latent image. Then, the develop units form toner images on the photoconductive drums, respectively, and the transfer chargers transfer the toner images in the respective colors onto a paper sheet, and lastly, the fuser unit 901 fuses an image thereon.

Second Embodiment

Next, an image formation apparatus according to the second embodiment of the present invention will be described with reference to FIGS. 7 to 11. The identical or equivalent components thereof to those of the image formation apparatus according to the first embodiment will be given the same numeric codes, and description thereon will be omitted or simplified.

Figure 7:
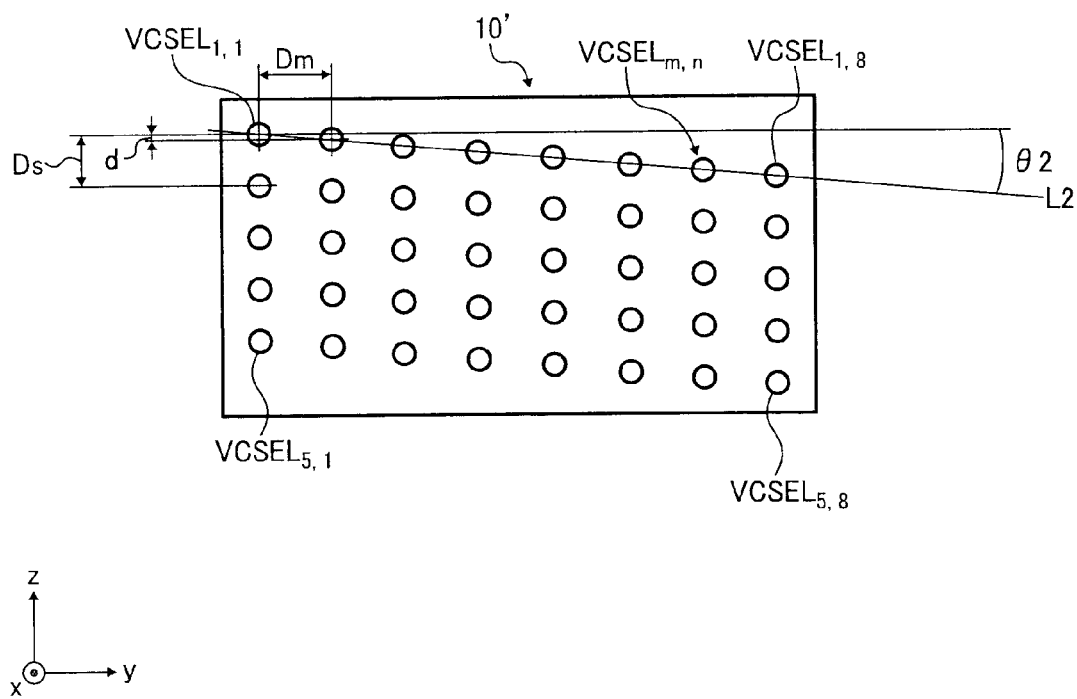
FIG. 7 shows a light source 10'.

FIG. 7 shows a light source 10' of the image formation apparatus according to the second embodiment. The light source 10' is a surface emitting semiconductor laser array on which luminous points such as VCSELs are two-dimensionally arranged. It differs from the light source 10 of the first embodiment in the arrangement of luminous points. As shown in FIG. 7, 40 VCSELs are arranged in matrix of 5 rows, 8 columns on a light emitting plane (x-axis direction side in the drawing) of the light source 10'. The rows are arranged in a direction in parallel with the straight line L2 which makes an angle θ2 with the y-axis direction, and the columns are arranged in a direction in parallel with the z-axis direction. In the present embodiment, the interval of the rows Ds is set to be 16 μm while the interval of the columns Dm is set to be 30.0 μm. The interval d of adjacent VCSELs in the z-axis direction (sub scan direction) is set to be 2.0 μm. Note that hereinafter, the positions of the VCSELs will be expressed in such a manner that a VSCEL located at m-th row, n-th column is referred to as VCSELm, n (m=1, 2, 3, 4, 5 n=1, 2, 3 ... 8) for the sake of simplicity as shown in FIG. 7.

Figure 8:
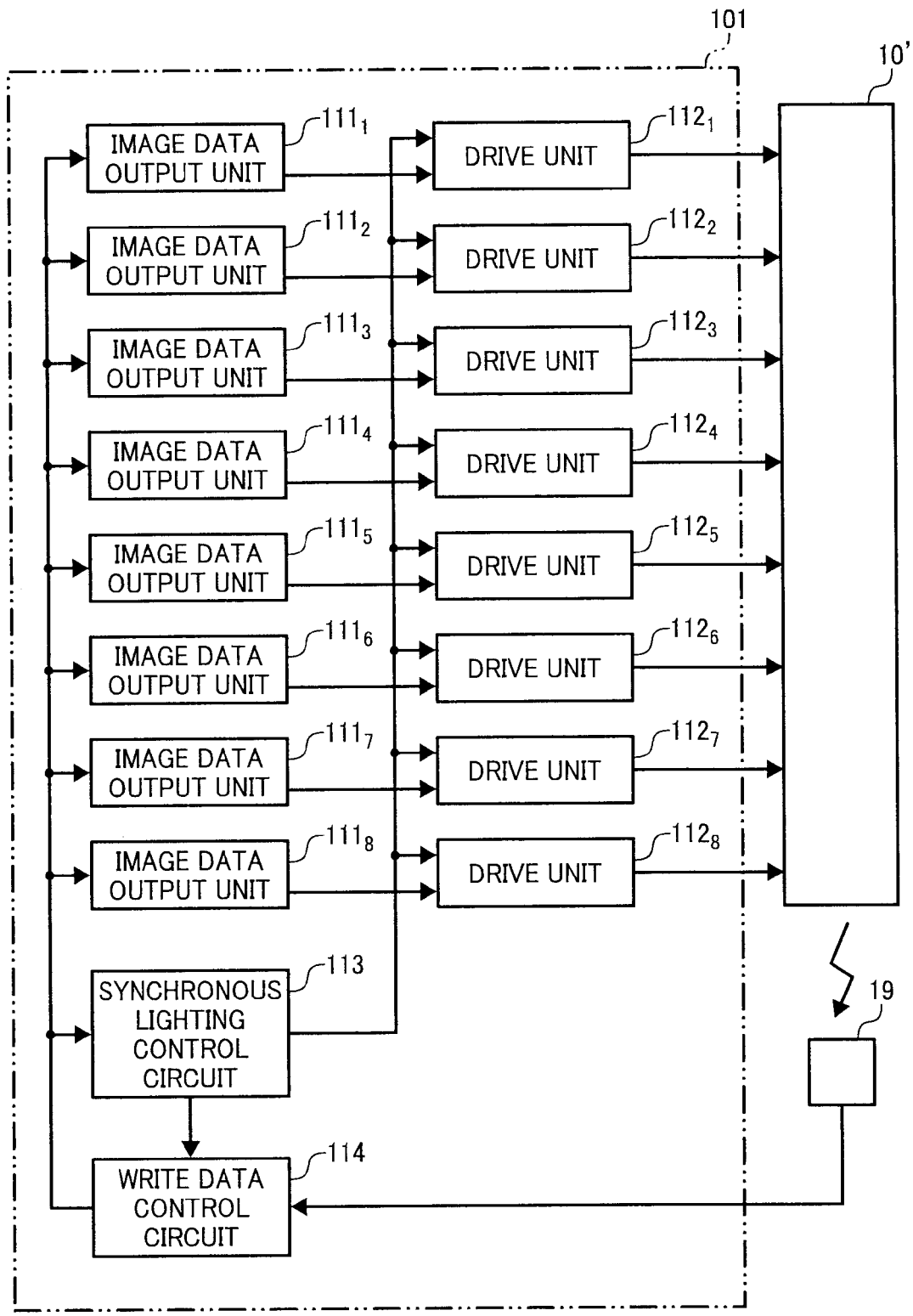
FIG. 8 shows a light source driver 101 according to a second embodiment of the present invention.

The VCSELs of the light source 10' are individually driven by a light source driver 101 shown in FIG. 8. The light source driver 101 comprises eight drive units $112_1$ to $112_8$, eight image data output units $111_1$ to $111_8$, a write data control circuit 114, and a synchronous lighting control circuit 113.

Figure 9:
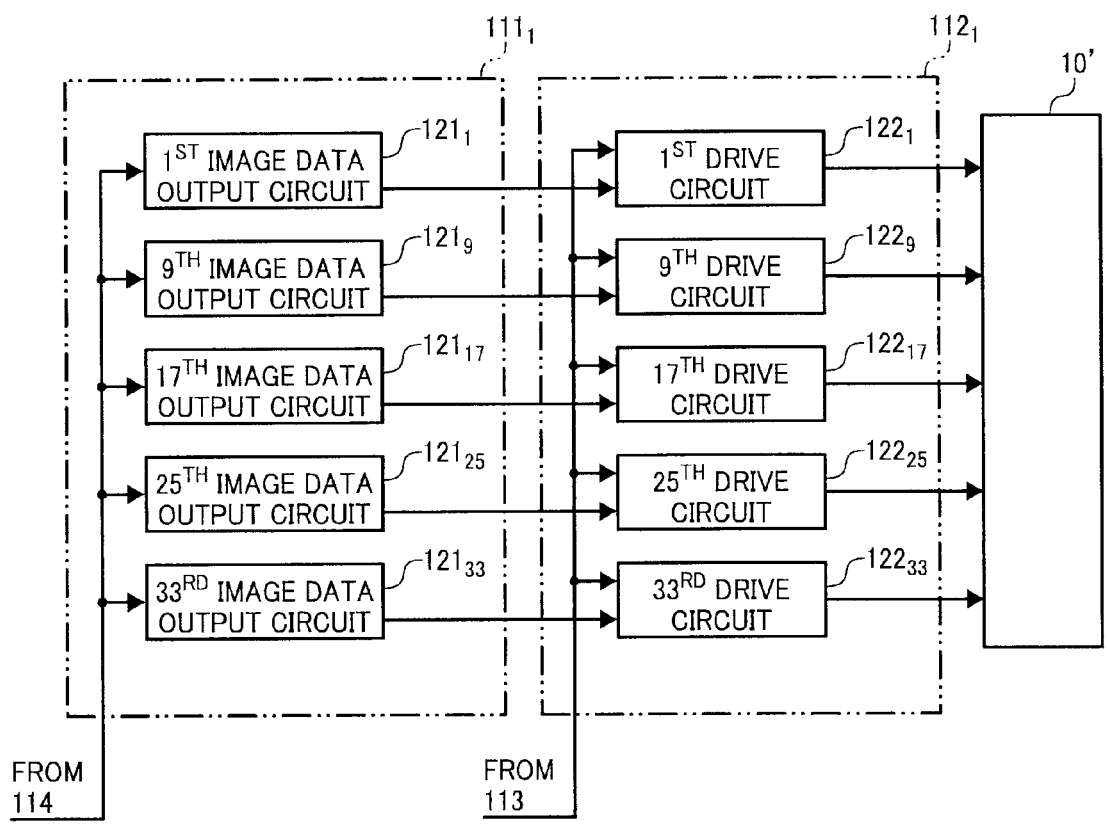
FIG. 9 shows structure of an image data output unit 111 and a drive unit 112.

The drive units $112_1$ to $112_8$ each comprise five drive circuits 122 lighting 5 VCSELs in each column of the light source 10', respectively. FIG. 9 shows a drive unit $112_1$ for example. The drive circuits 122 drive (light) their corresponding VCSELs in accordance with an input drive signal. According to the present embodiment, the 40 drive circuits 122 in total are assigned numbers from $122_1$ to $122_{40}$, and the first to eighth drive circuits $122_1$ to $122_8$ drive the VCSELs in the first row, the $9^{th}$ to $16^{th}$ drive circuits $122_9$ to $122_{16}$ drive ones in the second row, the $17^{th}$ to $24^{th}$ drive circuits $122_{17}$ to $122_{24}$ drive ones in the third row, $25^{th}$ to $32^{nd}$ drive circuits $122_{25}$ to $122_{32}$ drive ones in the fourth row, and $33^{rd}$ to $40^{th}$ drive circuits $122_{33}$ to $122_{40}$ drive ones in the fifth row.

The eight image data output units $111_1$ to $111_8$ each comprise five image data output circuits 121 in correspondence with the five drive circuits 122. The 40 image data output circuits 121 in total are assigned numbers from $121_1$ to $121_{40}$. FIG. 9 shows an image data output unit $111_1$ as a way of example. The five image data output circuits $121_{1, 9, 17, 25, 32}$ store (buffer) image data supplied in advance from a higher-order apparatus or the like and output drive signals modulated according to the image data to the five drive circuits $122_{1, 9, 17, 25, 32}$, in synchronization with a write gate signal supplied from the write data control circuit 114 later described.

Monitoring a synchronous detection signal from the light receiving element 19, the write data control circuit 114 outputs a write gate signal to each of the image data output units $111_1$ to $111_8$ and the synchronous lighting control circuit 113 at a predetermined timing in accordance with the synchronous detection signal and column information from the synchronous lighting control circuit 113. In the present embodiment, VCSELs in the n-th column corresponding to the drive unit $112_n$ are lighten by the write gate signal's being supplied to the respective drive circuits 122 of the drive unit $112_n$. For this reason, hereinafter, the write gate signal supplied to the driver unit $112_n$ will be referred to as n-th column write gate signal.

The synchronous lighting control circuit 113 selectively outputs a synchronous lighting signal to any of the drive units $112_1$ to $112_8$ according to a write gate signal from the write data control circuit 114 in order to light corresponding VCSELs and outputs information about the selected drive unit to the write data control circuit 114. In the present embodiment, VCSELs in the n-th column corresponding to the drive unit 112 are lighten by the synchronous lighting signal's being supplied to the respective drive units 122 of the drive unit $112_n$. Thus, hereinafter, the synchronous lighting signal supplied to the driver unit $112_n$ will be referred to as n-th column synchronous lighting signal.

In the following, operation of the optical scan apparatus 100 with the light source driver 101 according to the present embodiment will be described.

FIG. 10A shows the above-described synchronous detection signal, the first to eighth column synchronous lighting signals and the first to eighth column write gate signals. The respective signals in the drawing are observed when the VCSELs in the first column, for example, are lighten to monitor a change (falling) of the synchronous detection signal and the VCSELs of the light source 10' are controlled in synchronization with the change of the synchronous detection signal.

As shown in FIG. 10A, at time $t_0$ in a predetermined time after start of the first scanning, the synchronous lighting control circuit 113 of the light source driver 101 turns the first column synchronous lighting signal to be supplied to the drive unit $112_1$ to high in synchronization with a not-shown write gate signal from the write data control circuit 114. The 1$^{st}$ 9$^{th}$, 17$^{th}$, 25$^{th}$, and 33$^{rd}$ drive circuits 122$_1$, 122$_9$, 122$_{17}$, 122$_{25}$, 122$_{33}$ turn on their corresponding VCSELs in the first column respectively, in synchronization with the rising of the first column synchronous lighting signal. Thereby, the light source 10' emits the light beams which are to scan in the main scan direction deflected by the polygon mirror 15 of FIG. 2 and be incident on the light receiving element 19.

Upon the incidence of the light beam on the light receiving element 19, the synchronous detection signal turns to low for a very short period of time from time t$_1$. The write data control circuit 114 stops outputting the write gate signal to the synchronous lighting control circuit 113 at time t$_2$ in synchronization with the rising of the synchronous detection signal. This results in turning the first column synchronous lighting signal to low and turning off the VCSELs in the first column of the light source 10'.

Next, the write data control circuit 114 turns the first column write gate signal to high for a predetermined period of time from t$_5$ which is in a predetermined time T11 after the time t$_1$ as the falling time of the synchronous detection signal. The 1$^{st}$, 9$^{th}$, 17$^{th}$, 25$^{th}$, and 33$^{rd}$ image data output circuits 121$_1$, 121$_9$, 121$_{17}$, 121$_{25}$, 121$_{33}$ of the image data output unit 111$_1$ output drive signals modulated according to image information to the 1$^{st}$, 9$^{th}$, 17$^{th}$, 25$^{th}$, and 33$^{rd}$ drive circuits 122$_1$, 122$_9$, 122$_{17}$, 122$_{25}$, 122$_{33}$ in synchronization with the rising of the first column write gate signal, respectively. This results in driving each of the VCSELs in the first column of the light source 10' according to image information.

Further, the write data control circuit 114 turns the second to eighth column write gate signals to high in sequence for a predetermined time, every time a predetermined time T elapses from the time t$_5$. Accordingly, similarly to the VCSELs in the first column, the VCSELs in the second to eighth columns are driven to form a latent image in the write region of the photoconductive drum 201 by the first scanning. Note that the time T is determined depending on the distance Dm between the neighboring VCSELs in the y-axis direction.

After completion of the first scanning to the photoconductive drum 201, as shown in FIG. 10B, the synchronous lighting control circuit 113 turns the second column synchronous lighting signal supplied to the drive unit 112$_2$ to high at time t$_0$ which is in a predetermined time after start of the second scanning, in synchronization with a not-shown write gate signal from the write data control circuit 114. The 2$^{nd}$, 10$^{th}$, 18$^{th}$, 26$^{th}$, 34$^{th}$ drive circuits 122$_2$, 122$_{10}$, 122$_{18}$, 122$_{26}$, 122$_{34}$ of the drive unit 112$_2$ turn on their corresponding VCSELs in the second column of the light source 10' in synchronization with the rising of the second column synchronous lighting signal. Thereby, the light source 10' emits the light beams which are to be deflected by the polygon mirror 15 of FIG. 2 to scan in the main scan direction and be incident on the light receiving element 19.

Upon the incidence of the light beams on the light receiving element 19, the synchronous detection signal turns to low for a very short period of time from time t$_3$. The write data control circuit 114 stops outputting the write gate signal to the synchronous lighting control circuit 113 at time t$_4$ in synchronization with the rising of the synchronous detection signal. This results in turning the second column synchronous lighting signal to low and turning off the VCSELs in the second column of the light source 10'.

Next, for the second scanning, the write data control circuit 114 turns the first column write gate signal to high for a predetermined period of time from when a predetermined time T21 (=T11−T) has elapsed after the time t$_3$ as the falling time of the synchronous detection signal. The 1$^{st}$, 9$^{th}$, 17$^{th}$, 25$^{th}$, and 33$^{rd}$ image data output circuits 121$_1$, 121$_9$, 121$_{17}$, 121$_{25}$, 121$_{33}$ of the image data output unit 111$_1$ output drive signals modulated according to image information to the 1$^{st}$, 9$^{th}$, 17$^{th}$, 25$^{th}$, and 33$^{rd}$ drive circuits 122$_1$, 122$_9$, 122$_{17}$, 122$_{25}$, 122$_{33}$ of the drive unit 112$_1$ in synchronization with the rising of the first column write gate signal. This results in driving each of the VCSELs in the first column of the light source 10' according to image information.

Further, the write data control circuit 114 turns the second to eighth column write gate signals to high for a predetermined period of time in sequence every time a predetermined time T elapses from the time t$_5$. Accordingly, similarly to the VCSELs in the first column, the VCSELs in the second to eighth columns are driven to form a latent image in the write region of the photoconductive drum 201 by the second scanning.

Figure 11A:
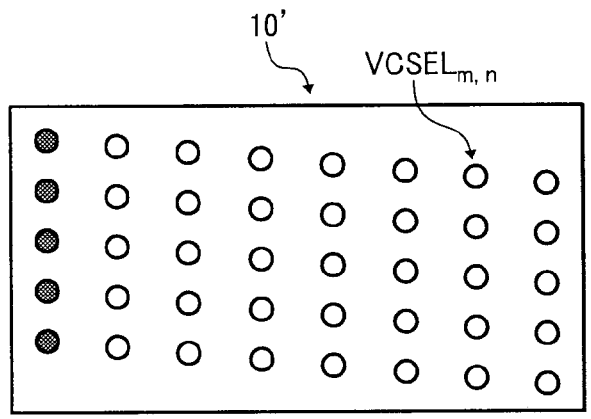
FIGS. 11A to 11C are for describing operation of the light source 10'.
Figure 11B:
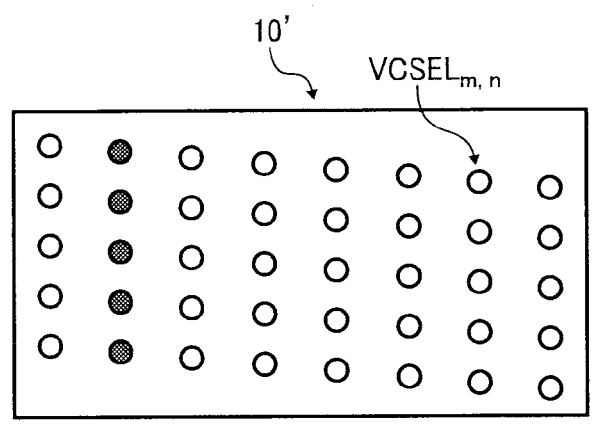
Figure 11C:
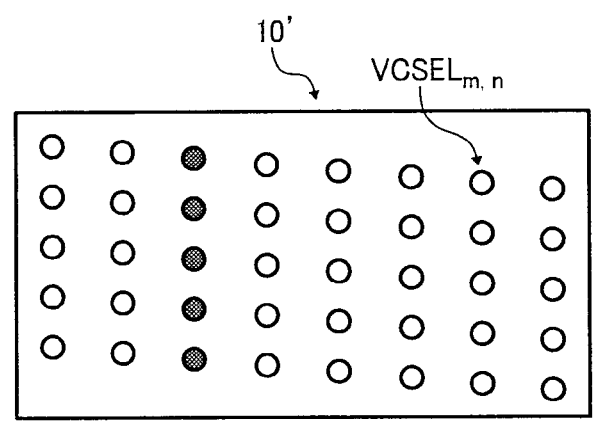

As described above, in the present embodiment, the VCSELs in the first column of the light source 10' are lighten before start of the first scanning to thereby change the synchronous lighting signal, as shown in FIG. 11A, while the VCSELs in the second column of the light source 10' are lighten before start of the second scanning to thereby change the synchronous lighting signal, as shown in FIG. 11B. Likewise, for the third and subsequent scannings, VCSELs in the third to eighth columns are selectively lighten sequentially before start of each scanning to thereby change the synchronous lighting signal. FIG. 11C shows that the VCSELs in the third column are lighten for the third scanning.

Also in the second embodiment, this accordingly allows the 40 VCSELs to equally share thermal load of the light source 10' due to the emission of the light beams for obtaining the synchronous detection signals and makes it possible to lengthen the longevity of the light source 10'.

According to the present invention, before scanning the write region of the scan surface, any one of the emission portions is selected to emit the light beam to be incident on the light receiving element which outputs the synchronous detection signal. This enables the plurality of emission portions to equally share the thermal load due to the repetitive emission of the light beams for synchronization, resulting in lengthening the longevity of the light source.

Further, the above-described image formation apparatus is configured to include the optical scan apparatus according to the present invention so that the deterioration of the light source can be effectively suppressed, and as a result, increase of the longevity of the image formation apparatus and reduction of the running cost thereof are achievable.

The first and second embodiments have described an example where the optical scan apparatus according to the present invention is used in the printer. However, the optical scan apparatus is suitable for other image formation apparatuses such as a copier, a facsimile machine, or a complex machine of these machines.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical scan apparatus which deflects a plurality of light beams to scan a write region on a scan surface in a main scan direction, comprising:
   a light source having a plurality of emission portions arranged two-dimensionally on a plane in parallel to the main scan direction and a sub scan direction perpendicular to the main scan direction, the plurality of emission portions emitting the plurality of light beams;

a deflector deflects to deflect the plurality of light beams from the plurality of emission portions;

a control unit to selectively control any one of the emission portions to emit a synchronous detection light beam and to generate a synchronous lighting signal each time the write region on the scan surface is scanned with the plurality of light beams in the main scan direction; and a light receiving element to receive and electrically convert the synchronous lighting signal for output.

2. An optical scan apparatus according to claim 1, wherein the control unit selectively controls different emission portions to emit synchronous detection light beams for preceding and succeeding scannings in order.

3. An optical scan apparatus according to claim 2, wherein the control unit selectively controls sequential emission portions to emit synchronous detection light beams.

4. An optical scan apparatus according to claim 1, wherein:
the light source includes a plurality of columns of the emission portions arranged adjacent to each other in the sub scan direction; and
the control unit selectively controls the emission portions to emit synchronous detection light beams in unit of column.

5. An optical scan apparatus according to claim 4, wherein the control unit selectively controls the emission portions to emit synchronous detection light beams in unit of column in order.

6. An optical scan apparatus according to claim 1, wherein the control unit selectively controls one of an emission portion closest to end of the light source in the main scan direction and an emission portion closest to end of the light source in the sub scan direction, to emit the synchronous detection light beam.

7. An optical scan apparatus according to claim 1, wherein:
the light source includes at least one emission portion for synchronous detection to emit only a synchronous detection light beam to be incident on the light receiving element; and
the control unit selectively controls, every time the write region on the scan surface is scanned with the plurality of light beams in the main direction, only the at least one emission portion for synchronous detection to emit only the synchronous detection light beam to be incident on the light receiving element.

8. An optical scan apparatus according to claim 1, wherein the control unit controls two or more emission portions of the plurality of emission portions to emit synchronous detection light beams to be incident on the light receiving element.

9. An optical scan apparatus according to claim 1, wherein the control unit controls the emission portions to emit synchronous detection light beams such that an intensity of the synchronous detection light beam to be incident on the light receiving element is to be larger than that of a light beam to be incident on the scan surface.

10. An optical scan apparatus according to claim 1, wherein the control unit controls the emission portions to emit synchronous detection light beams such that intensity of the synchronous detection light beam to be incident on the light receiving element is to be a preset value.

11. An image formation apparatus which forms an image by forming a toner image based on a latent image obtained from image information and fusing the toner image on a recording medium, the apparatus comprising:
an optical scan apparatus which deflects a plurality of light beams to scan a write region on a scan surface in a main scan direction, including
a light source having a plurality of emission portions arranged two-dimensionally on a plane in parallel to the main scan direction and a sub scan direction perpendicular to the main scan direction, the plurality of emission portions emitting the plurality of light beams,
a deflector to deflect the plurality of light beams from the plurality of emission portions,
a control unit to selectively control any one of the emission portions to emit a synchronous detection light beam and to generate a synchronous lighting signal each time the write region on the scan surface is scanned with the plurality of light beams in the main scan direction, and
a light receiving element to receive and electrically convert the synchronous lighting signal for output; and
a photoconductor on which a latent image is formed by the optical scan apparatus;
a develop unit which visualizes the latent image formed on a scan surface of the photoconductor as a toner image; and
a transfer unit which fuses the toner image visualized by the develop unit on the recording medium.

12. An image formation apparatus which forms a multi-color image by forming toner images based on latent images in respective colors obtained from multi-color image information and superimposing and fusing the toner images on a recording medium, the apparatus comprising:
an optical scan apparatus which deflects a plurality of light beams to a scan a write region on a scan surface in a main scan direction, including
a light source having a plurality of emission portions arranged two-dimensionally on a plane in parallel to the main scan direction and a sub scan direction perpendicular to the main scan direction, the plurality of emission portions emitting the plurality of light beams,
a deflector to deflect the plurality of light beams from the plurality of emission portions,
a control unit to selectively control any one of the emission portions to emit a synchronous detection light beam and to generate a synchronous lighting signal each time the write region on the scan surface is scanned with the plurality of light beams in the main scan direction, and
a light receiving element to receive and electrically convert the synchronous lighting signal for output; and
a plurality of photoconductors on which latent images in respective colors are formed by the optical scan apparatus, respectively;
a develop unit which visualizes the latent images formed on scan surfaces of the photoconductors as toner images; and
a transfer unit which superimposes and fuses the toner images in respective colors visualized by the develop unit on the recording medium.

* * * * *